(12) United States Patent
Haga et al.

(10) Patent No.: US 9,387,784 B2
(45) Date of Patent: Jul. 12, 2016

(54) HEADREST AND VEHICLE SEAT PROVIDED THEREWITH

(71) Applicant: TOYOTA JIDOSHA KABUSHIKI KAISHA, Toyota-shi, Aichi-ken (JP)

(72) Inventors: Kouichiro Haga, Toyota (JP); Manabu Ishimoto, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/427,902

(22) PCT Filed: Aug. 23, 2013

(86) PCT No.: PCT/JP2013/072610
§ 371 (c)(1),
(2) Date: Mar. 12, 2015

(87) PCT Pub. No.: WO2014/050392
PCT Pub. Date: Apr. 3, 2014

(65) Prior Publication Data
US 2015/0343927 A1 Dec. 3, 2015

(30) Foreign Application Priority Data
Sep. 25, 2012 (JP) ................. 2012-211326

(51) Int. Cl.
*B60N 2/42* (2006.01)
*B60R 21/055* (2006.01)
*B60N 2/48* (2006.01)
*F16F 7/108* (2006.01)

(52) U.S. Cl.
CPC ............. *B60N 2/4805* (2013.01); *B60N 2/48* (2013.01); *B60N 2/4885* (2013.01); *F16F 7/108* (2013.01); *B60N 2002/4888* (2013.01)

(58) Field of Classification Search
CPC ...... B60N 2/4885; B60N 2/4805; B60N 2/48; B60N 2002/4888; F16F 7/108
USPC ............. 297/DIG. 1, 391, 216.12, 452.37, 297/452.27
See application file for complete search history.

(56) References Cited

U.S. PATENT DOCUMENTS

| 3,642,323 | A | * | 2/1972 | Taylor | 297/452.17 |
| 4,756,551 | A | * | 7/1988 | Miller | 280/751 |
| 5,681,088 | A | * | 10/1997 | Takei | 297/408 |
| 2014/0312675 | A1 | | 10/2014 | Okubo | |

FOREIGN PATENT DOCUMENTS

| CN | 103826917 A | 5/2014 |
| EP | 2 759 442 A1 | 7/2014 |
| JP | 2001-161489 A | 6/2001 |
| JP | 2010-194246 A | 9/2010 |

(Continued)

*Primary Examiner* — Milton Nelson, Jr.
(74) *Attorney, Agent, or Firm* — Oliff PLC (57) ABSTRACT

It is obtained a headrest and a vehicle seat provided therewith, capable of obtaining attenuating effect characteristics with respect to oscillation at two resonant frequencies with a simple configuration. A mass body is supported by an elastically deformable first urethane member configuring part of a headrest pad inside a headrest cover of a vehicle seat. Namely, a dynamic damper is configured including the first urethane member and the mass body. The center of gravity of the mass body is set at a position offset in the seat width direction with respect to the elastic center of the first urethane member.

6 Claims, 4 Drawing Sheets

(56) References Cited

FOREIGN PATENT DOCUMENTS

| JP | 2010-201848 A | 9/2010 |
| JP | 2013-107491 A | 6/2013 |
| WO | 2013/042791 A1 | 3/2013 |
| WO | 2014/050377 A1 | 4/2014 |

* cited by examiner

HEADREST AND VEHICLE SEAT PROVIDED THEREWITH

TECHNICAL FIELD

The present invention relates to a headrest and a vehicle seat provided therewith.

BACKGROUND ART

Patent Document 1 describes a vehicle seat with a dynamic damper configured by a mass body integrally supported inside a pad. Patent Document 2 below describes a headrest with a dynamic damper configured by a resilient resin material that is injected and foamed inside a mold envelope, and a weight that is disposed fixed inside the mold envelope. This related art enables noise and vibration performance (NV performance) to be improved since the dynamic dampers attenuate oscillation.

RELATED PATENT DOCUMENTS

Patent Document 1: Japanese Patent Application Laid-Open (JP-A) No. 2001-161489
Patent Document 2: Japanese Patent Application Laid-Open (JP-A) No. 2010-194246

SUMMARY OF INVENTION

Technical Problem

However, the related art makes no reference to obtaining attenuating effect characteristics with respect to oscillation at two resonant frequencies with a simple configuration, and so there is room for improvement in this regard.

In consideration of the above circumstances, an object of the present invention is to obtain a headrest, and a vehicle seat provided therewith, capable of obtaining attenuating effect characteristics with respect to oscillation at two resonant frequencies with a simple configuration.

Solution to Problem

A headrest according to a first aspect of the present invention includes a headrest pad disposed inside a headrest cover, and including an elastically deformable cushion portion configuring part of a dynamic damper, and a mass body configuring part of the dynamic damper and supported by the cushion portion with a center of gravity of the mass body set at a position offset with respect to a elastic center of the cushion portion.

According to the above configuration, the headrest pad is disposed inside the headrest cover of a vehicle seat, and the headrest pad includes the elastically deformable cushion portion configuring part of the dynamic damper. The cushion portion supports the mass body configuring part of the dynamic damper. Namely, the headrest is provided with the dynamic damper including the cushion portion and the mass body. Oscillation of the seat is suppressed by setting the frequency characteristics of the dynamic damper such that the dynamic damper is effective in a suppression-desired seat oscillation frequency region.

The center of gravity of the mass body is set at a position offset with respect to the elastic center of the cushion portion. During seat oscillation, the mass body attempts to undergo rotational movement about the center of gravity while attempting to undergo linear movement in the oscillation direction. The ratio of linear movement along the oscillation direction to rotational movement about the center of gravity varies depending on the oscillation frequency. Namely, two modes of displacement of the mass body are obtained during seat oscillation, one mode of which relates to mainly linear movement and the other mode of which relates to mainly rotational movement. Varying the spring constant of the cushion portion to correspond to the two modes enables two resonant frequencies to be set for the single mass body.

A second aspect of the present invention is the headrest of the first aspect, wherein the center of gravity of the mass body is set at a position offset in at least one of a seat width direction or a seat up-down direction with respect to the elastic center of the cushion portion.

According to the above configuration, during oscillation in the seat front-rear direction, the mass body attempts to undergo rotational movement about the center of gravity while attempting to undergo linear movement in the seat front-rear direction. The ratio of linear movement in the seat front-rear direction to rotational movement about the center of gravity changes according to the oscillation frequency. Namely, during oscillation in the seat front-rear direction, the mass body can undergo displacement in two modes, one mode of which relates to mainly linear movement and the other mode of which relates to mainly rotational movement. Varying the spring constant of the cushion portion to correspond to the two modes enables two resonant frequencies to be set for the single mass body with respect to oscillation in the seat front-rear direction. Setting the dynamic damper frequency characteristics such that the dynamic damper is also effective in a frequency region that raises the performance of the headrest to follow the head of an occupant accompanying seat front-rear direction oscillation in the event of a rear-on collision enables a reduction in the load on the neck of the occupant in the event of a rear-on collision.

A third aspect of the present invention is the headrest of the second aspect, wherein the mass body is formed as a shape with at least one of left-right asymmetry or up-down asymmetry.

According to the above configuration, forming the mass body as a shape with at least one of left-right asymmetry or up-down asymmetry enables the center of gravity of the mass body to be set at a position offset in at least one of the seat width direction or the seat up-down direction with respect to the elastic center of the cushion portion, even when the cushion portion is configured from a uniform material. Note that the left-right direction of "left-right asymmetry" is the left-right direction of the headrest (namely the seat width direction), and the up-down direction of "up-down asymmetry" is the up-down direction of the headrest (namely the seat up-down direction).

A fourth aspect of the present invention is the headrest of any one of the first aspect to the third aspect, wherein the headrest pad includes a first cushion material configuring the cushion portion and a second cushion material with a higher elastic modulus than the first cushion material.

According to the above configuration, the headrest pad includes the second cushion material with a higher elastic modulus than the first cushion material configuring the cushion portion. In the event of a rear-on collision, the second cushion material raises the support rigidity of the headrest with respect to the head of the occupant, as well suppressing the amplitude of the mass body. This latter effect reduces the load on the neck of the occupant caused by oscillation of the mass body in the seat front-rear direction.

A fifth aspect of the present invention is the headrest of the fourth aspect, wherein the first cushion material includes a first overlap portion set at a position overlapping the mass body as viewed from the front of the seat, and the second cushion material includes a second overlap portion set at a position overlapping the mass body and the first overlap portion as viewed from the front of the seat.

According to the above configuration, when the headrest oscillates in the seat front-rear direction during normal seat oscillation, the mass body undergoes displacement while elastically deforming the first overlap portion, thereby attenuating the oscillation. However, when the mass body attempts to oscillate in the seat front-rear direction at an amplitude of the amplitude during normal seat oscillation, or at a greater amplitude, the second overlap portion suppresses the oscillation of the mass body. The amplitude of the mass body in the seat front-rear direction is accordingly effectively suppressed in the event of a rear-on collision, thus effectively reducing the load on the neck of the occupant caused by oscillation of the mass body in the seat front-rear direction.

A sixth aspect of the present invention is the headrest of either the fourth aspect or the fifth aspect, wherein the first cushion material covers an entire periphery of a peripheral edge of the mass body.

According to the above configuration, the first cushion material covers the entire periphery of the peripheral edge of the mass body, thereby enabling the frequency characteristics of the dynamic damper to be set more easily than when the mass body is covered by the first cushion material and the second cushion material. Namely, in order to make the dynamic damper effective in the two frequency regions of the frequency region of suppression-desired seat oscillation during normal operation, and the frequency region to raise the following performance of the headrest, it is sufficient to adjust the mass of the mass body, and/or factors such as the rigidity, volume, and shape of the first cushion material.

A vehicle seat according to a seventh aspect of the present invention includes a seat cushion on which an occupant sits, a seatback supported at a rear end portion of the seat cushion, and the headrest of any one of the first aspect to the sixth aspect, disposed at an upper end portion of the seatback to support the head of the occupant.

The above configuration enables the vehicle seat to obtain similar operation to the headrest of the first aspect of the present invention.

Advantageous Effects of Invention

As described above, the present invention exhibits the excellent advantageous effect of enabling attenuating effect characteristics to be obtained with respect to oscillation at two resonant frequencies with a simple configuration.

DESCRIPTION OF EMBODIMENTS

First Exemplary Embodiment

Explanation follows regarding a first exemplary embodiment of the present invention, with reference to FIG. 1 to FIG. 4B. Note that in the drawings, the arrow FR indicates the vehicle front side, the arrow UP indicates the vehicle upper side, and the arrow W indicates the vehicle width direction as appropriate. In the drawings, the vehicle front-rear direction is the same direction as the seat front-rear direction, the vehicle up-down direction is the same direction as the seat up-down direction, and the vehicle width direction is the same direction as the seat width direction.

Figure 1:
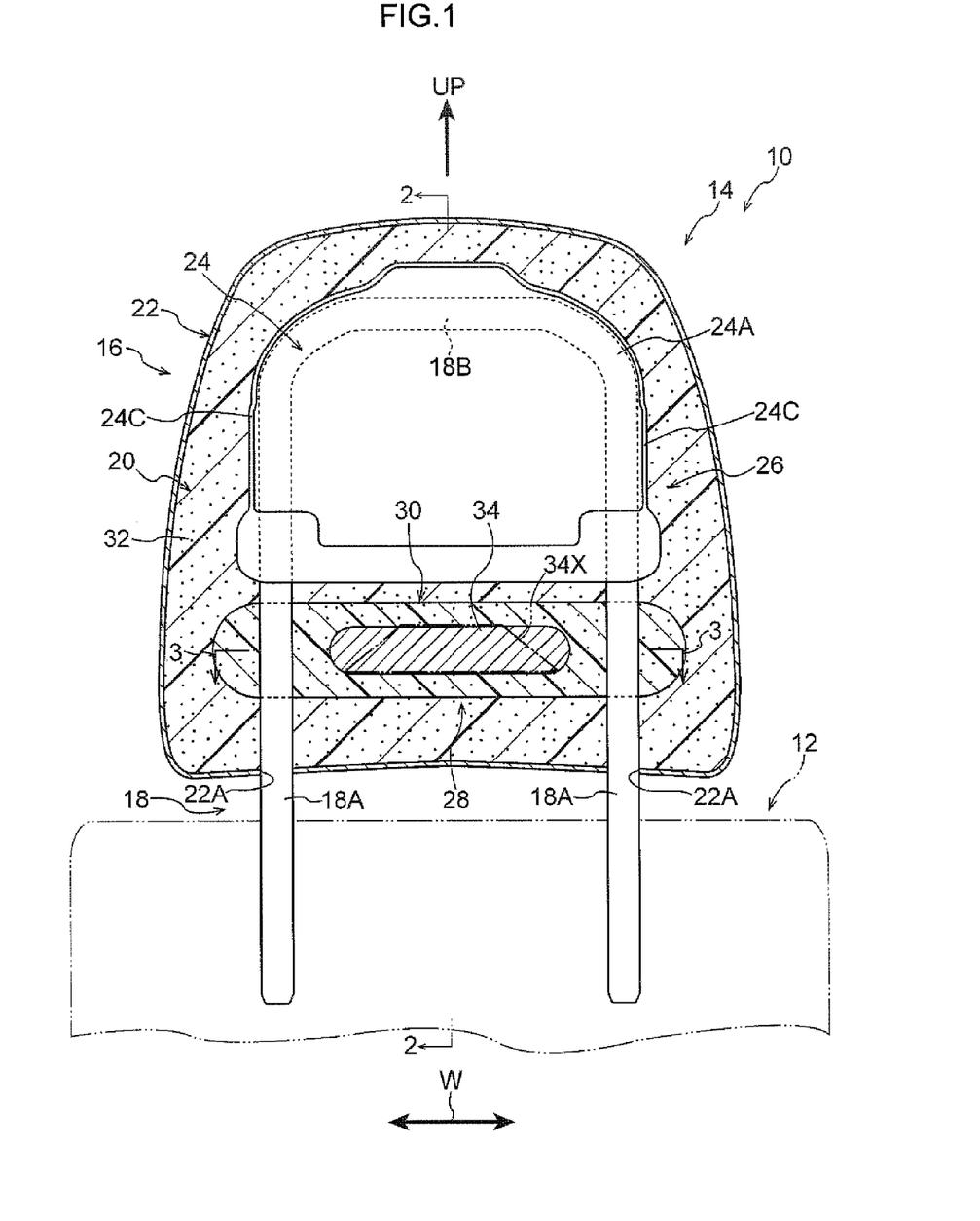
FIG. 1 is a cross-section (a drawing sectioned at the position of a front face of a resin cover at an upper portion of a headrest, and sectioned at the position of front faces of the legs of a headrest stay at a lower portion of the headrest) illustrating a headrest of a vehicle seat according to a first exemplary embodiment, as viewed from the front of the seat.
Figure 2:
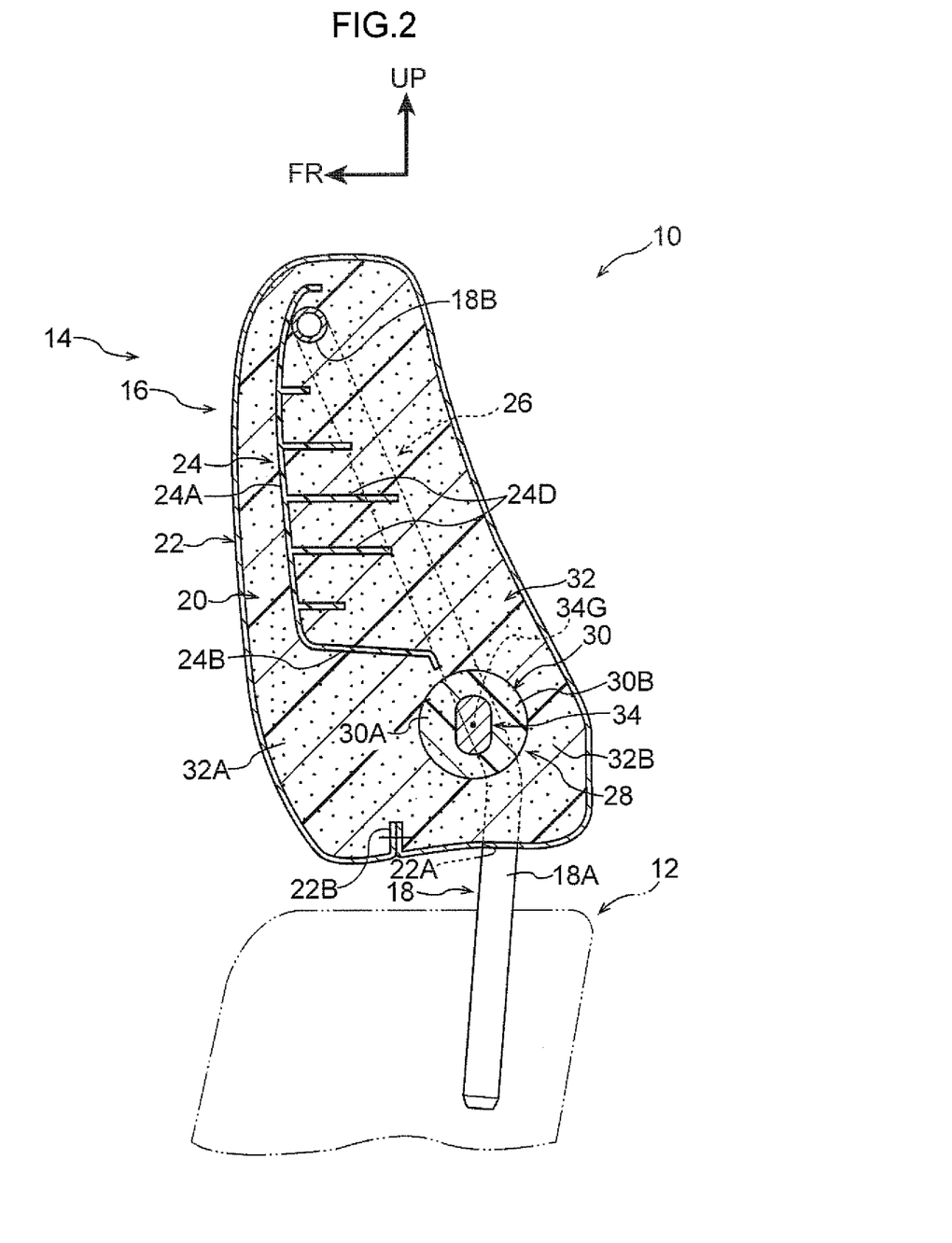
FIG. 2 is a cross-section taken along line 2-2 in FIG. 1.

FIG. 1 is a cross-section illustrating a headrest of a vehicle seat according to the present exemplary embodiment, as viewed from the front of the seat. FIG. 2 is a cross-section taken along line 2-2 in FIG. 1. A vehicle seat 10 illustrated in FIG. 1 and FIG. 2 is installed in a vehicle and includes a seat cushion, not illustrated in the drawings, on which an occupant sits. A seatback 12 is reclinably supported at a rear end portion of the seat cushion. The double-dotted intermittent lines in FIG. 1 and FIG. 2 illustrate only an upper end portion of the seatback 12. A headrest 14 that supports the head of the occupant is disposed at the upper end portion of the seatback 12.

The headrest 14 is configured including a pillow shaped headrest body 16 that supports the head of the occupant, and a headrest stay 18 extending from a lower face of the headrest body 16 toward the vehicle lower side.

The headrest stay 18 is a metal pipe formed into an upside-down U shape, and includes a pair of left and right legs 18A. The pair of left and right legs 18A are inserted into headrest supports, not illustrated in the drawings, of the seatback 12, and are thereby supported by the seatback 12. The headrest 14 is thus supported by the seatback 12. The legs 18A extend in the seat height direction, and upper portion sides thereof are disposed inside the headrest body 16. Bent portions are provided at the lower ends of the sections of the legs 18A disposed inside the headrest body 16, and the sections to the seat upper side of the bent portions are tilted slightly toward the seat front side. A coupling portion 18B couples together the upper ends of the legs 18A in the seat width direction.

The headrest body 16 includes a headrest pad 20 configuring a cushion area of the headrest body 16, a headrest cover (covering) 22 covering the headrest pad 20, and a resin cover 24 embedded inside the headrest pad 20. Stay insertion holes 22A for insertion of the legs 18A of the headrest stays 18 are formed at a lower end of the headrest cover 22. As illustrated in FIG. 2, a stitched seam 22B is configured to the seatback front side of the stay insertion holes 22A.

The resin cover 24 (also referred to as "resin pad" and "insert") is disposed at the upper portion side and to the seat front side of the headrest stay 18. The resin cover 24 includes a front wall 24A with a front face facing the seat front side. A lower wall 24B is formed extending from a lower end portion of the front wall 24A toward the seat rear side. Side walls 24C (see FIG. 1) are formed extending toward the seat rear side from both seat width direction sides of the front wall 24A.

Although not illustrated in detail, the resin cover 24 is formed with an anchor portion that anchors to the headrest stay 18. Plural ribs 24D extending along the seat width direction, and plural ribs extending along the seat up-down direction (not illustrated in the drawings), are formed to a seat rear side-facing face of the front wall 24A.

The headrest pad 20 illustrated in FIG. 1 and FIG. 2 includes a first urethane member 30 serving as an elastically deformable first cushion material (broadly speaking, a "spring element"), and a second urethane member 32 serving as a second cushion material with a higher elastic modulus than (that is harder than) the first urethane member 30. The first urethane member 30 and the second urethane member 32 are both disposed inside the headrest cover 22, and are formed by foaming and molding urethane. In the present exemplary embodiment, the first urethane member 30 (inner urethane foam) is embedded inside the second urethane member 32 (outer urethane foam).

As illustrated in FIG. 1, the first urethane member 30 is disposed to the seat lower side of the resin cover 24, and is disposed with its length direction along the seat width direction. Both seat width direction ends of the resin cover 24 are fixed to the respective legs 18A of the headrest stay 18 by the adhesive strength of the urethane itself. Namely, the first urethane member 30 spans between the pair of left and right legs 18A of the headrest stay 18. The first urethane member 30 configures a cushion portion of a dynamic damper 28 provided to the headrest 14.

A mass body 34, configuring part of the dynamic damper 28, is embedded in a length direction intermediate portion of the first urethane member 30. Namely, the entire periphery of the peripheral edge of the mass body 34 is covered by the first urethane member 30, and the mass body 34 is supported by the first urethane member 30. In the present exemplary embodiment, the entire periphery (entire region) of the mass body 34 is joined to the first urethane member 30. The first urethane member 30 includes a pair of front and rear first overlap portions 30A, 30B (see FIG. 2), set at positions overlapping with the mass body 34 as viewed from the front of the seat. In FIG. 2, out of the pair of front and rear first overlap portions 30A, 30B, the first overlap portion 30A is shown set at the seat front side of the mass body 34, and the first overlap portion 30B is shown set at the seat rear side of the mass body 34.

The second urethane member 32 is set with a greater volume than the volume of the first urethane member 30. The second urethane member 32 includes a pair of front and rear second overlap portions 32A, 32B set at positions overlapping with the mass body 34 and the first overlap portion 30A as viewed from the front of the seat. In FIG. 2, the second overlap portion 32A is shown set at the seat front side of the mass body 34 and the first overlap portion 30A, and the second overlap portion 32B is shown set at the seat rear side of the mass body 34 and the first overlap portion 30B.

Explanation follows regarding an example of the setting of the respective moduli of elasticity of the first urethane member 30 and the second urethane member 32 illustrated in FIG. 1 and FIG. 2. In the present exemplary embodiment, the second urethane member 32, for example, employs a material with a higher modulus of elasticity than the material of the first urethane member 30. Note that the second urethane member 32 may be configured using the same material as the first urethane member 30, set with a lower expansion ratio than the first urethane member 30. The spring constant of the first urethane member 30 is set at a spring constant best suited to correspond to noise and vibration for the oscillation anticipated during normal operation, namely for cases in which the amplitude of the mass body 34 is below a specific value (in a low displacement region). In contrast thereto, in anticipation of rear-on collisions, the spring constant of the second urethane member 32 is set at the spring constant best suited to correspond to a rear-on collision when the amplitude of the mass body 34 is the specific value or above (in a high displacement region). Note that the spring characteristics of the second urethane member 32 may be set in consideration of a range of spring constants allowing the head of the occupant to be supported in comfort.

Figure 3:
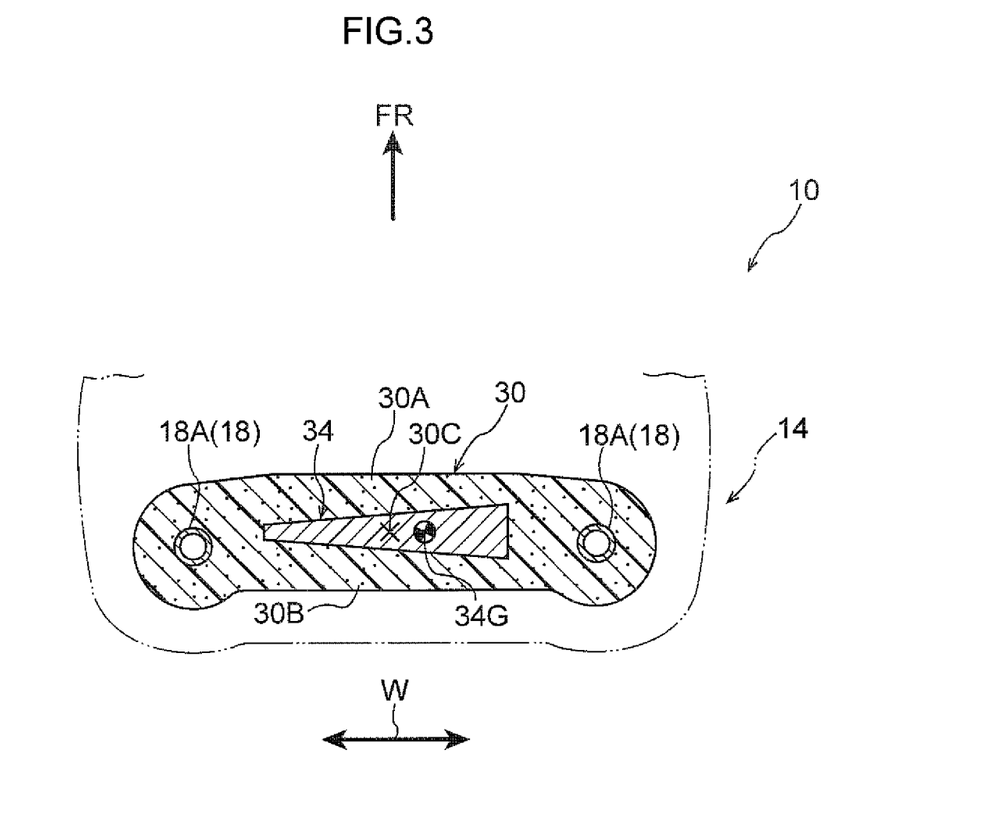
FIG. 3 is a cross-section taken along line 3-3 in FIG. 1.

FIG. 3 is a cross-section taken along line 3-3 in FIG. 1. As illustrated in FIG. 1 and FIG. 3, the mass body 34 is disposed between the pair of left and right legs 18A of the headrest stay 18 with length direction along the seat width direction, and is set at a position overlapping with the pair of left and right legs 18A when viewed from the side of the seat as illustrated in FIG. 2. Note that in the present exemplary embodiment, the center of gravity 34G (center) of the mass body 34 overlaps with the pair of left and right legs 18A as viewed from the side of the seat.

As illustrated in FIG. 1 to FIG. 3, the mass body 34 is a bar shaped member, and as illustrated in FIG. 3, the mass body 34 is formed such that the seat front-rear direction length becomes gradually shorter on progression toward the left side of the seat. Namely, the shape of the mass body 34 is a left-right asymmetrical shape from one seat width direction side to the other seat width direction side in plan view of the seat. The mass body 34 is accordingly set such that the center of gravity 34G is at a position offset from the elastic center 30C of the first urethane member 30 in the seat width direction. The elastic center 30C of the first urethane member 30 is a point of intersection of respective center lines of resilient recovery of the first urethane member 30 in the seat width direction, the seat front-rear direction, and the seat up-down direction when the first urethane member 30 undergoes elastic deformation due to oscillation of the mass body 34.

As illustrated in FIG. 1 and FIG. 2, a projected surface area (see FIG. 1) of a contact portion where the mass body 34 contacts the first urethane member 30 as viewed from the front of the seat is set larger than the projected surface area of the contact portion as viewed from the side of the seat (see FIG. 2). The first urethane member 30 is accordingly set with higher rigidity with respect to seat front-rear direction displacement of the mass body 34 than the rigidity with respect to seat width direction displacement of the mass body 34. In other words, the mass body 34 supported by the first urethane member 30 is set to have a higher resonant frequency in the seat front-rear direction than its resonant frequency in the seat width direction.

The structure of the present exemplary embodiment may also be thought of as being a structure including a main oscillation system having a seat framework portion of the vehicle seat 10 installed on the vehicle floor as a spring and the overall headrest 14 as a mass, and a dynamic damper 28 provided with a spring and a mass in the headrest 14.

Headrest Manufacturing Method

Next, explanation follows regarding a manufacturing method of the headrest 14.

First, the resin cover 24 is attached to the headrest stay 18 illustrated in FIG. 1. Next, the mass body 34 is placed between the legs 18A of the headrest stay 18 in a stay assembly 26 including the resin cover 24 and the headrest stay 18. The raw material of the first urethane member 30 is then supplied and molded by foaming (a first stage foaming process) so as to couple the mass body 34 to the legs 18A at the sides thereof, thereby fixing the mass body 34 to the legs 18A.

Next, the headrest cover 22 is suspended upside-down in a state prior to being stitched together at the stitched seam 22B illustrated in FIG. 2, and the stay assembly 26 is inserted into the headrest cover 22 from the upper side in an upside-down orientation. The legs 18A of the headrest stay 18 are then inserted into the stay insertion holes 22A. In this state, the raw material of the second urethane member 32 is injected inside the headrest cover 22 and molded by foaming (a second stage foaming process), thereby forming the headrest pad 20. Lastly, the headrest cover 22 is stitched together at the stitched seam 22B.

When employing such a method, fixing the mass body 34 to the legs 18A in the first stage foaming process enables the mass body 34 to be prevented from coming away from its planned installation position during the second stage foaming process.

Operation and Advantageous Effects

Explanation follows regarding operation and advantageous effects of the present exemplary embodiment.

According to the configuration of the present exemplary embodiment, the headrest pad 20 is disposed inside the headrest cover 22 of the vehicle seat 10, and the headrest pad 20 includes the elastically deformable first urethane member 30 configuring part of the dynamic damper 28. The first urethane member 30 moreover supports the mass body 34 configuring part of the dynamic damper 28. Namely, the headrest 14 is provided with the dynamic damper 28 including the first urethane member 30 and the mass body 34. The frequency characteristics of the dynamic damper 28 are set such that the dynamic damper 28 is effective over a suppression-desired seat oscillation frequency region, thereby suppressing seat oscillation.

As illustrated in FIG. 3, the center of gravity 34G of the mass body 34 is set at a position offset in the seat width direction with respect to the elastic center 30C of the first urethane member 30. The mass body 34 therefore attempts to undergo rotational movement about the center of gravity 34G while attempting to undergo linear movement (translational movement) in the seat front-rear direction along the oscillation direction during oscillation in the seat front-rear direction. The ratio of linear movement in the seat front-rear direction to rotational movement about the center of gravity 34G varies according to the oscillation frequency.

Figure 4A:
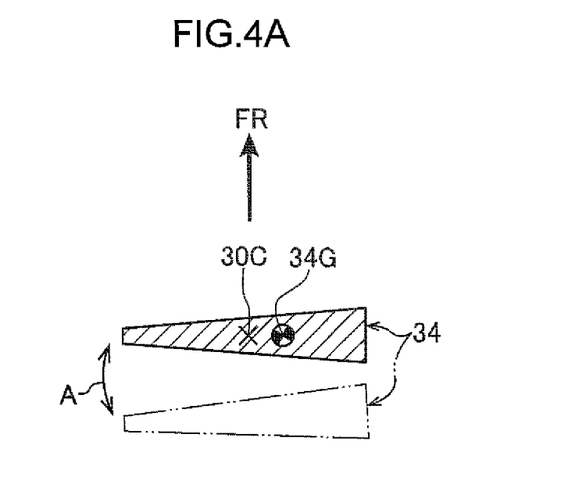
FIG. 4A is a schematic drawing illustrating displacement of a mass body in a low frequency oscillation resonance mode.
Figure 4B:
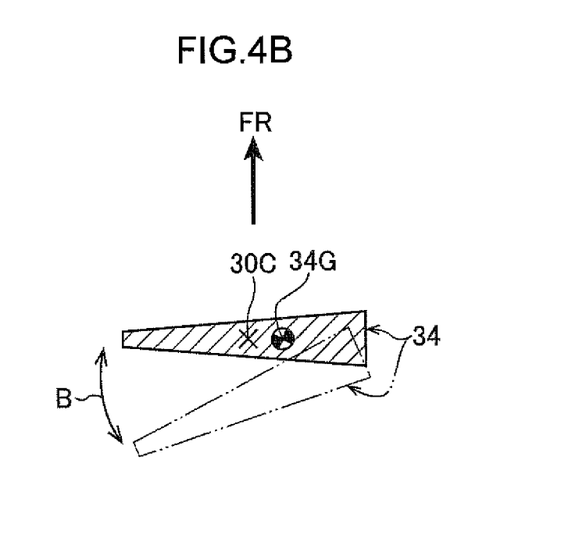
FIG. 4B is a schematic drawing illustrating displacement of a mass body in a high frequency oscillation resonance mode.

In the present exemplary embodiment, as illustrated in FIG. 4A the mass body 34 undergoes mainly linear movement (see the arrow A direction) accompanying low frequency oscillation, and, as illustrated in FIG. 4B, undergoes mainly rotational movement about the center of gravity 34G (see the arrow B direction) accompanying high frequency oscillation. This enables two modes of displacement of the mass body 34 to be obtained accompanying oscillation in the seat front-rear direction: namely a mode with mainly linear movement (see FIG. 4A); and a mode with mainly rotational movement (see FIG. 4B). Since the spring constant of the first urethane member 30 (see FIG. 3) can be varied corresponding to these two modes, the single mass body 34 can be set with two resonant frequencies. Load acting on the neck of the occupant in a rear-on collision is reduced by setting the frequency characteristics of the dynamic damper 28 such that the dynamic damper 28 is also effective in a frequency region that raises the performance of the headrest 14 illustrated in FIG. 2 to follow the head of the occupant in the event of a rear-on collision.

Additional explanation follows regarding operation during a rear-on collision, with the dynamic damper 28 set with the frequency characteristics described above. Firstly, in an initial stage of a rear impact to the vehicle, the headrest 14 is pushed toward the seat front side together with the seatback 12. When this occurs, the mass body 34 attempts to remain in the same position under inertia, resulting in a state in which the first urethane member 30 undergoes elastic deformation and the mass body 34 swings toward the seat rear side. At the following stage, the headrest 14 contacts the head of the occupant, suppressing the head from tilting toward the rear. When this occurs, movement of the headrest 14 toward the seat front side is suppressed, and the mass body 34 that has swung toward the seat rear side then swings toward the seat front side under the recovery force of the first urethane member 30 and the inertia of the mass body 34. This accordingly suppresses the headrest 14 from rebounding away from the head of the occupant. The following performance of the headrest 14 with respect to the head is accordingly improved.

Moreover, as illustrated in FIG. 3, in the present exemplary embodiment the shape of the mass body 34 is formed in a left-right asymmetrical shape. This accordingly enables the center of gravity 34G of the mass body 34 to be set at a position offset with respect to the elastic center 30C of the first urethane member 30, even when the first urethane member 30 is configured from a uniform material.

As illustrated in FIG. 1 and FIG. 2, the headrest pad 20 includes the second urethane member 32 with a higher modulus of elasticity than the first urethane member 30. In the event of a rear-on collision, the second urethane member 32 raises the support rigidity of the headrest 14 with respect to the head of the occupant, and also suppresses the amplitude of the mass body 34. This latter effect reduces the load to the neck of the occupant due to oscillation of the mass body 34 in the seat front-rear direction.

In the present exemplary embodiment, when the headrest 14 illustrated in FIG. 2 oscillates in the seat front-rear direction during normal seat oscillation, the mass body 34 undergoes displacement while elastically deforming the first overlap portions 30A, 30B, thereby attenuating the oscillation. However, when the mass body 34 attempts to oscillate in the seat front-rear direction at an amplitude of the amplitude during normal seat oscillation, or a greater amplitude, the second overlap portions 32A, 32B suppress the oscillation of the mass body 34. The amplitude of the mass body 34 in the seat front-rear direction is accordingly effectively suppressed in the event of a rear-on collision, thus effectively reducing the load on the neck of the occupant caused by oscillation of the mass body 34 in the seat front-rear direction.

In the present exemplary embodiment, the first urethane member 30 covers the entire periphery of the peripheral edge of the mass body 34, and so the frequency characteristics of the dynamic damper 28 can be set more easily than when, for example, the mass body 34 is covered by the first urethane member 30 and the second urethane member 32. Namely, in order to make the dynamic damper 28 effective in the two frequency regions, the frequency region of suppression-desired oscillation and the frequency region to raise the following performance of the headrest 14, it is sufficient to adjust the mass of the mass body 34, and/or factors such as the rigidity, volume, and shape of the first urethane member 30.

As described above, the headrest 14 of the present exemplary embodiment enables characteristics exhibiting an attenuating effect on oscillation at two resonant frequencies to be achieved with a simple configuration (without providing plural mass bodies).

Since the present exemplary embodiment is not provided with plural of the mass bodies 34, the number of components can be reduced, and the assembly process can be simplified, in comparison to when plural mass bodies are provided.

Second Exemplary Embodiment

Next, explanation follows regarding a second exemplary embodiment of the present invention. The headrest pad 20 employed in the first exemplary embodiment illustrated in FIG. 1 is configured including the first urethane member 30 and the second urethane member 32 that have different moduli of elasticity to each other. However, a headrest pad employed in the second exemplary embodiment is configured from a single type of urethane foam. Other configurations are similar to those of the first exemplary embodiment.

Namely, although omitted from illustration in the drawings, similarly to in the first exemplary embodiment, the headrest pad of the second exemplary embodiment is disposed inside a headrest cover, and is elastically deformable. A portion of the headrest pad configures a cushion portion (doubling as an attenuation region) configuring part of a dynamic damper. A mass body (34) configuring part of the dynamic damper is supported in the cushion portion. The center of gravity of the mass body (34) is set at a position offset in the seat width direction with respect to the elastic center of the cushion portion.

This configuration also enables characteristics exhibiting an attenuating effect on oscillation at two resonant frequencies to be achieved with a simple configuration (without providing plural mass bodies).

Additional Explanation of Exemplary Embodiments

As modified examples of the above exemplary embodiments, the shape of the mass body may be a left-right asymmetrical shape as viewed from the front of the seat, may be an up-down asymmetrical shape as viewed from the front of the seat, or may be an up-down asymmetrical shape as viewed from the side of the seat. To explain such examples further, instead of the shape illustrated in FIG. 1, the shape of the mass body as viewed from the front of the seat may be an up-down asymmetrical shape (a shape asymmetrical between one seat up-down direction side and the other seat up-down direction side), as illustrated by the double-dotted intermittent line 34X in FIG. 1. In such cases, the center of gravity of the mass body is set at a position offset in both the seat width direction and the seat up-down direction with respect to the elastic center of the cushion portion (first urethane member 30). The shape of the mass body may be an up-down asymmetrical shape, such as that illustrated by the double-dotted intermittent line 34X in FIG. 1, when viewed from the front of the seat, and a shape with left-right symmetry between one seat width direction side and the other seat width direction side in plan view of the seat. In such cases, the center of gravity of the mass body is set at a position offset in seat up-down direction, but not offset in the seat width direction, with respect to the elastic center of the cushion portion (first urethane member 30).

As a modified example of the above exemplary embodiments, when seeking attenuating effect characteristics with respect to oscillation at two resonant frequencies not including oscillation in the vehicle front-rear direction, the center of gravity of the mass body may be set at a position offset in the seat front-rear direction with respect to the elastic center of the cushion portion. In such cases, the shape of the mass body may be a front-rear asymmetrical shape.

As a modified example of the above exemplary embodiments, the mass body may, for example, be provided at an upper end portion of the headrest, and disposed so as to be partially exposed from the headrest pad, without being embedded in the headrest pad. Moreover, plural of the mass bodies may be provided.

As a modified example of the above exemplary embodiments, the mass body that is disposed with length direction along the seat width direction may be set such that both seat width direction side portions have a greater weight than a seat width direction central portion. In such cases, in a structure in which the relative weights of the seat width direction central portion of the mass body and both seat width direction side portions of the mass body are set at a specific ratio or above, during oscillation in the seat front-rear direction, the mass body undergoes displacement in a mode with mainly rotational movement under low frequency oscillation, and undergoes displacement in a mode with mainly linear movement under high frequency oscillation.

As a modified example of the above exemplary embodiments, at least one of the first cushion material or the second cushion material may be configured from a different cushion material, such as a resin foamed body other than urethane, felt, or rubber.

As a modified example of the above exemplary embodiments, the elastic modulus of the cushion portion supporting the mass body may be varied between the left side and the right side in the seat width direction, such that center of gravity of the mass body is set at a position offset in the seat width direction with respect to the elastic center of the cushion portion. In such cases, the mass body may be formed in a left-right symmetrical shape. Moreover, the elastic modulus of the cushion portion supporting the mass body may be varied between the upper side and the lower side in the seat up-down direction, such that the center of gravity of the mass body is set at a position offset in the seat up-down direction with respect to the elastic center of the cushion portion. In such cases, the mass body may be formed in an up-down symmetrical shape. When seeking attenuating effect characteristics with respect to oscillation at two resonant frequencies not including oscillation in the vehicle front-rear direction, the elastic modulus of the cushion portion supporting the mass body may be varied between the front side and the rear side in the seat front-rear direction. Such a setting enables the center of gravity of the mass body to be set at a position offset in the seat front-rear direction with respect to the elastic center of the cushion portion. In such cases, the mass body may be formed with a front-rear symmetrical shape.

As a modified example of the above exemplary embodiments, the mass body may be disposed with length direction along the seat width direction, and the elastic modulus of the cushion portion supporting the mass body may be set higher at a seat width direction central portion of the mass body, and lower at both seat width direction sides of the mass body. In such cases, the mass body undergoes displacement in a mode with mainly rotational movement under low frequency oscillation, and undergoes displacement in a mode with mainly linear movement under high frequency oscillation.

As a modified example of the above exemplary embodiments, the first cushion material may be provided with the first overlap portion overlapping with the mass body as viewed from the front of the seat at only one of the seat front side and the seat rear side of the mass body. The first cushion material may also be configured so as not to overlap with the mass body as viewed from the front of the seat. The second cushion material may also be provided with the second overlap portion overlapping with the mass body and the first overlap portion as viewed from the front of the seat at only one of the seat front side and the seat rear side of the mass body and the first overlap portion. The second cushion material may also be configured so as not to overlap with the mass body and the first overlap portion as viewed from the front of the seat.

As a modified example of the above exemplary embodiments, a portion of the periphery of the mass body may be covered by the first cushion material, and another portion of the periphery of the mass body may be covered by the second cushion material.

The concept of "covering the entire periphery of the peripheral edge of the mass body" in the sixth aspect of the present invention encompasses not only cases in which the entire periphery of the peripheral edge of the mass body 34 is covered, as in the above exemplary embodiments, but also cases in which, although substantially the entire periphery of the peripheral edge of the mass body is covered, there are locally uncovered portions present, and so strictly speaking the entire periphery of the peripheral edge of the mass body cannot be said to be covered; however similar operation and advantageous effects can be obtained to when the entire periphery of the peripheral edge of the mass body is covered, and so in effect the entire periphery of the peripheral edge of the mass body may be understood as being covered.

The above exemplary embodiments and plural modified examples described above may be combined as appropriate.

Examples of the present invention have been described above, however the present invention is not limited to the above, and obviously various modifications may be implemented within a range not departing from the spirit of the present invention.

The disclosure of Japanese Patent Application No. 2012-211326 is incorporated by reference in the present specification in its entirety.

The invention claimed is:

1. A headrest comprising:
   a headrest pad disposed inside a headrest cover, and including an elastically deformable cushion portion configuring part of a dynamic damper; and
   a mass body configuring part of the dynamic damper and supported by the cushion portion such that a center of gravity of the mass body is offset from an elastic center of the cushion portion, wherein;
   the headrest pad includes a first cushion material configuring the cushion portion and a second cushion material with a higher elastic modulus than the first cushion material;
   the second cushion material covers an entire periphery of the first cushion material; and
   the center of gravity of the mass body is offset from an elastic center of the first cushion material.

2. The headrest of claim 1, wherein
the center of gravity of the mass body is set at a position offset in at least one of a seat width direction or a seat up-down direction with respect to the elastic center of the cushion portion.

3. The headrest of claim 2, wherein
the mass body is formed as a shape with at least one of left-right asymmetry or up-down asymmetry.

4. The headrest of claim 1, wherein:
the first cushion material includes a first overlap portion set at a position overlapping the mass body as viewed from a front of a seat; and
the second cushion material includes a second overlap portion set at a position overlapping the mass body and the first overlap portion as viewed from the front of the seat.

5. The headrest of claim 1, wherein
the first cushion material covers the entire periphery of the mass body.

6. A vehicle seat comprising:
a seat cushion on which an occupant can sit;
a seatback supported at a rear end portion of the seat cushion; and
the headrest of claim 1, disposed at an upper end portion of the seatback to support the head of the occupant.

* * * * *